4 Sheets—Sheet 1.

J. C. SHARP.
Stump-Extractor.

No. 206,837.　　　　Patented Aug. 6, 1878.

WITNESSES
Geo. W. Breck.
Wm. A. Hinkle.

INVENTOR
John C. Sharp
By his Attorneys
Baldwin, Hopkins, & Peyton

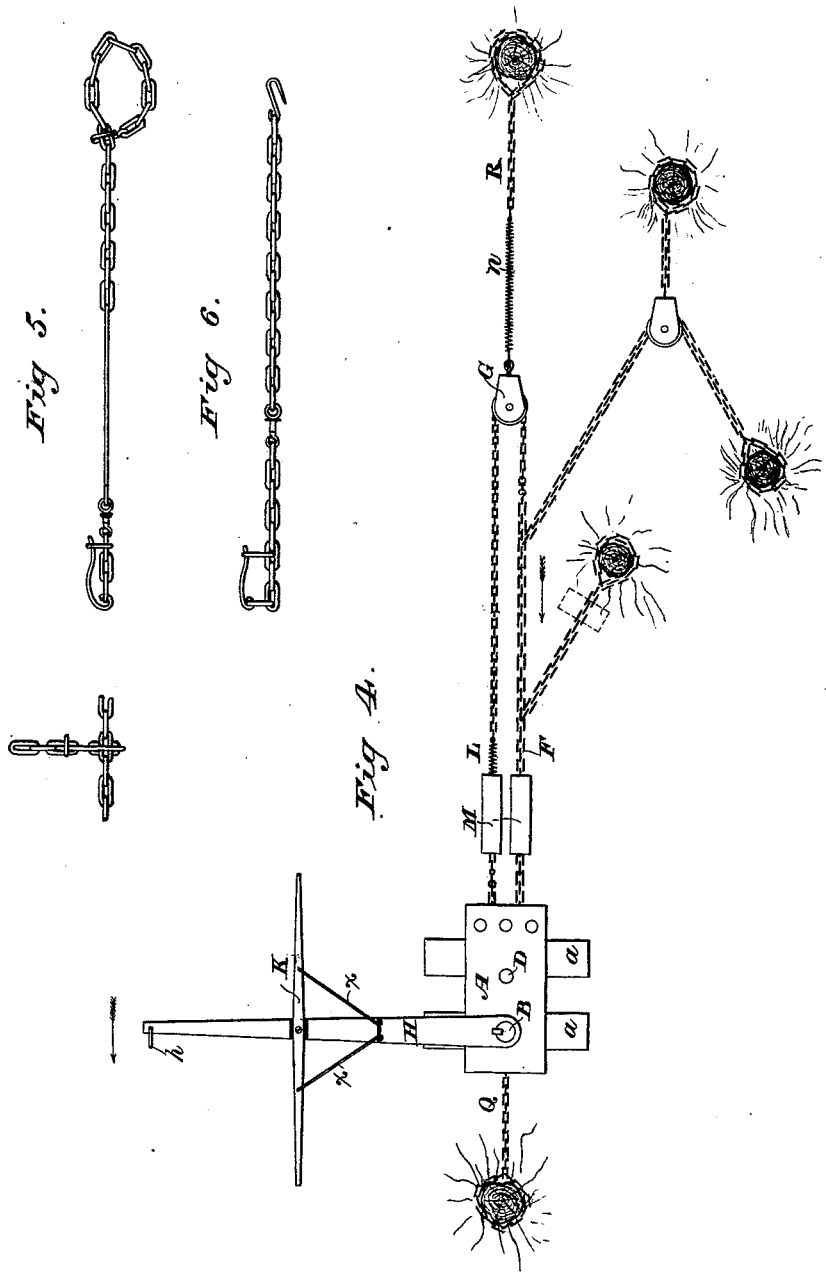

4 Sheets—Sheet 3.

J. C. SHARP.
Stump-Extractor.

No. 206,837. Patented Aug. 6, 1878.

WITNESSES
Geo. W. Breck
Wm A. Skrinkle

INVENTOR
John C Sharp
By his Attorneys
Baldwin, Hopkins, & Peyton

4 Sheets—Sheet 4.

J. C. SHARP.
Stump-Extractor.

No. 206,837. Patented Aug. 6, 1878.

WITNESSES
Geo. W. Breck,
Wm A Skinkle

INVENTOR.
John C Sharp.
By his Attorneys
Baldwin, Hopkins, & Peyton

UNITED STATES PATENT OFFICE.

JOHN C. SHARP, OF EVANSVILLE, WISCONSIN.

IMPROVEMENT IN STUMP-EXTRACTORS.

Specification forming part of Letters Patent No. 206,837, dated August 6, 1878; application filed July 30, 1878.

*To all whom it may concern:*

Figure 1:
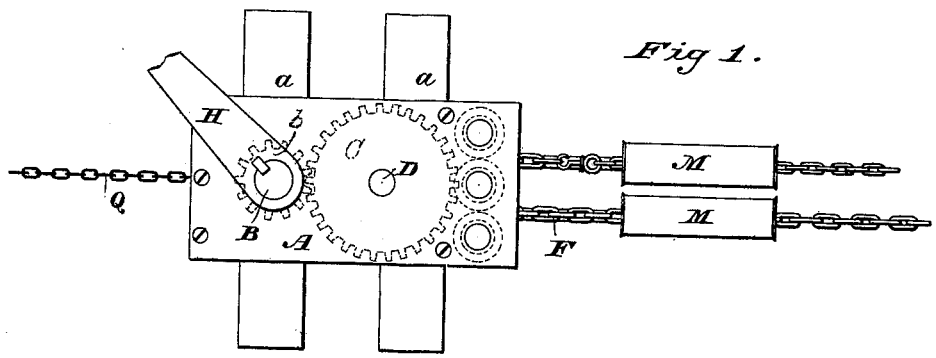
Figure 2:
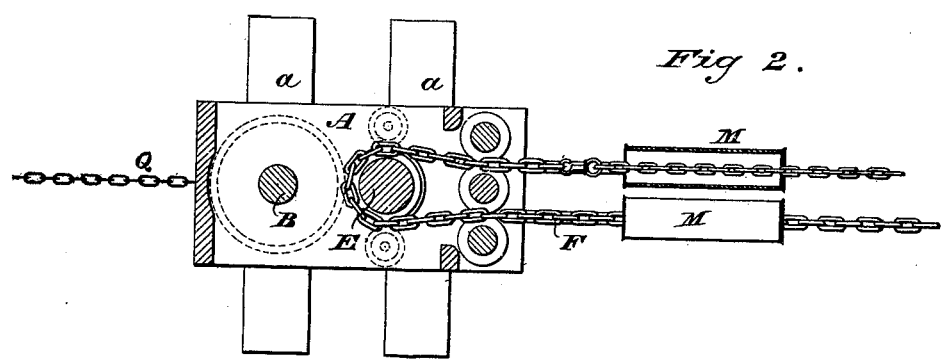
Figure 3:
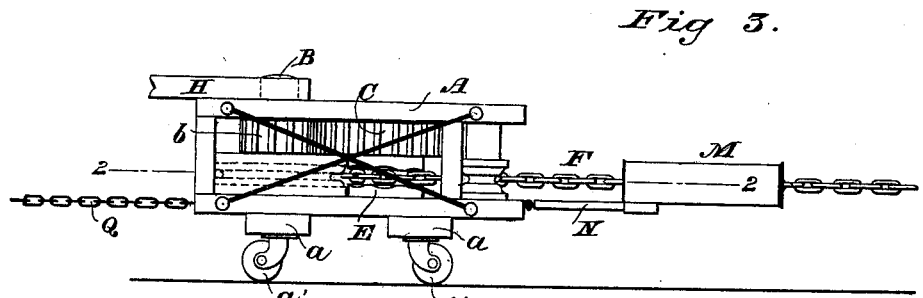
Figure 7:
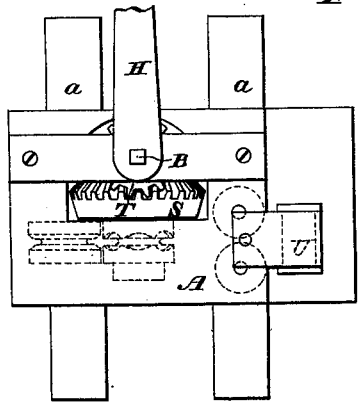
Figure 8:
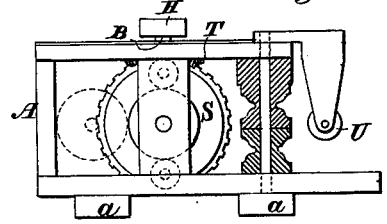
Figure 9:
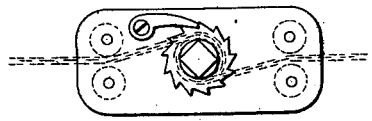
Figure 11:
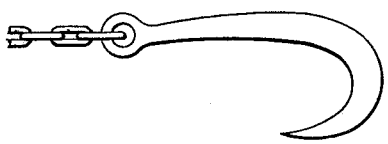
Figure 10:
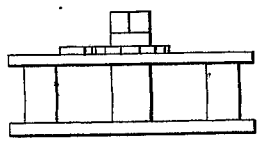
Figure 12:
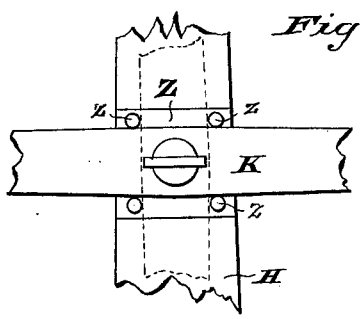
Figure 13:
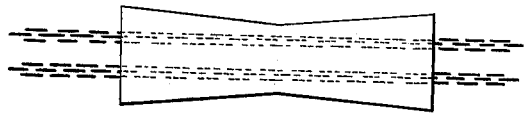
Figure 15:
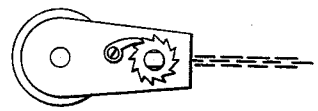
Figure 14:
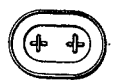
Figure 16:
Figure 17:
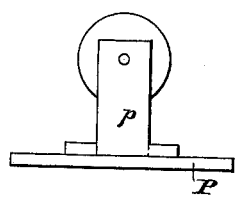
Figure 19:
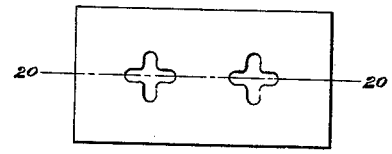
Figure 18:
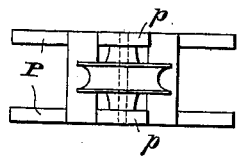
Figure 20:
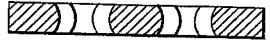
Figure 21:
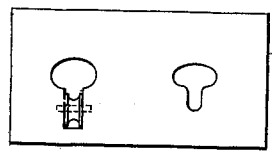

Be it known that I, JOHN C. SHARP, of Evansville, in the county of Rock and State of Wisconsin, have invented certain Improvements in Stump-Extractors, of which the following is a specification:

In the accompanying drawings, illustrating my invention, Figure 1 is a plan view of the frame and attached chains; Fig. 2, a section on line 2 2 of Fig. 3. Fig. 3 is a side elevation. Fig. 4 is a plan view, showing the apparatus applied. Figs. 5 and 6 represent hitching-chains. Fig. 7 is a plan view of a modification, and Fig. 8 is a side elevation of the same. Fig. 9 is a plan view of a portable windlass, roller, or capstan for taking up slack, and Fig. 10 is a side elevation of the same. Fig. 11 represents a stump-hook. Fig. 12 is a sectional plan view of the sweep with lead-bar adjustably attached by means of a studded casting. Fig. 13 represents a single shield for both chains. Fig. 14 represents an end view of the same. Fig. 15 represents the separate pulley-block provided with a roller and ratchet and pawl for taking up slack. Fig. 16 shows an ordinary hand-roller, to be used, if need be, for giving a lifting pull. Fig. 17 is a side elevation of a special roller and frame with straddling base for giving a lifting pull, and Fig. 18 is a plan view of the same. Fig. 19 is an elevation of a guide block or casting, with two apertures of the outline of the sprocket-chain, and Fig. 20 is a longitudinal section of the same. Fig. 21 is an elevation of a similar block or casting with the apertures only partly of the outline of the sprocket-chain, one of them being provided with a friction-roller.

A indicates a suitable strong frame properly braced, and preferably supported on flat transverse runners $a\ a$, which may be provided with wide caster-wheels $a'$ to aid in moving the machine. Journaled vertically in bearings in the frame is the driving-shaft B, carrying the pinion $b$. This pinion meshes in the wheel C fixed on the vertical shaft D, also journaled in the frame, on which shaft is secured the sprocket-wheel E, which may be cast in one piece with wheel C or be separate from it. In front of the sprocket-wheel are three guide-pulleys, either grooved or sprocketed, for guiding and holding taut the endless chain F, the center one being of about the diameter of the sprocket-wheel. The chain passes around the sprocket-wheel on each side of the central guide-pulley, where it is held by the outside guide-pulleys, and around a pulley in the block or shell G. I may provide two guide-pulleys, either grooved or sprocketed, immediately in connection with the sprocket-wheel, as shown in dotted lines, Fig. 2, in which case I could dispense with the three in front. I may also provide a guide-pulley, either grooved or sprocketed, on the driving-shaft, of suitable diameter to reach the rear of the sprocket-wheel and hold the chain in place, as shown by dotted lines, Figs. 2 and 3.

Instead of gearing the pinion $b$ directly with the wheel C, as above described, I may interpose one or more shafts, carrying spur-wheels and pinions, to extend the train of gears, and to diminish the velocity of the pull on the chain and correspondingly increase its power; but I do not deem these additional gears essential for the ordinary purposes of my machine, although I contemplate their use when needed.

The driving-shaft projects slightly above the frame, and to it is secured, in any suitable way, a draft-lever or sweep, H, carrying a clevis, $h$, pivoted so as to swing freely around the outer end of the sweep and accommodate draft in opposite directions. Fixed to this sweep, and crossing it about midway at right angles, and projecting out on each side a suitable distance, is a lead-bar, K, which may be provided at each end with a hook, peg, ring, snap, or other means of quickly looping or securing the halter to cause the horse to be led around in a circle as he pulls on the outer end of the sweep. The lead-bar is pivoted on the sweep so as to swing around in line with it and rest on its top for convenience and safety in transportation. To secure it in position at right angles to the sweep, and to permit it to turn from that position to a longitudinal one, I may pivot it by means of a capped bolt passing into or through the sweep, or a metallic plate secured on the sweep, and may provide two detachable braces or hook-rods, $x\ x$, to engage with it and the inner end of the sweep, or I may provide a plate, Z, with a central screw-hole and four studs, $z$, on its corners, as shown in Fig. 12. A thumb-screw may pass through the lead-bar into the plate, which, while down, will clamp the bar in place, and when up will permit it to be raised high enough to turn over the tops of the studs to change its position.

Instead of having an endless chain proper, which in practice should be, as a general rule, about one hundred feet long after being doubled, and quite strong, and therefore quite heavy, I propose in some cases to employ a sprocket-chain proper only about the length of one-half of the ordinary chain, or the full length of the ordinary chain when endless and doubled, and to each end of this half-chain I propose to secure a rope, cable, or small chain, to form an endless belt, as shown in Fig. 4, the object being to reduce the weight that would otherwise exist in the chain-belt, and diminish the cost of manufacture. I may employ swivels that will serve to aid the guide-pulleys in taking out any twist in the sprocket-chain that would prevent it from properly engaging with the sprockets; and this is an additional advantage of using only a half sprocket-chain, because where the whole chain is a sprocket-chain it is not only heavier, but more liable to become twisted and kinked and fail to work on the sprocket, since it is impossible to use a swivel in an endless sprocket-chain intended to work over the sprocket-wheel its entire length.

I sometimes provide one or more spiral springs L between the chain and the light chain, rope, or cable, that will yield somewhat when, in hitching and pulling, one-half of the endless-chain belt is drawn to one side. This spring relieves the strain on the cable in such cases and prevents its breaking, and when the pull is ended it contracts and takes up the slack.

In order to protect the feet and legs of the draft-animals in walking over the endless chain, I provide hollow shields M, through which the chain passes. These shields should be flared at their ends to prevent the chain from catching, and should be held in place by anchoring or by rigid rods N, that are pivoted to the machine so as to swing freely in all directions with the movements of the chain. Instead of having two shields, I may use but one large one, in the form, for instance, of reversed frustums of cones, as shown in Figs. 13 and 14.

I provide an anchor chain or cable, Q, for the machine, and another, R, for the pulley-block. I may use a spiral spring, n, in the latter, which will serve to some extent the same purpose as the spring L, above described, and may be employed efficiently in conjunction with spring L.

In the operation of this apparatus the machine is first anchored, the chain extended, and then the pulley-block anchored. In order to take up the slack in the endless-chain belt after anchoring, I may provide a roller or drum in connection with the pulley-block to which the anchor-cable R is attached, as shown in Fig. 15. This roller can, of course, be provided with a ratchet and spring-pawl. Instead of this device, I may make the anchor-cable in two pieces, and attach their ends to a roller, windlass, or capstan between them, which can be wound to take up the slack. All being now in readiness, suitable guy or side-hitch chains are fastened, one end to the sprocket-chain and the other to the stump to be extracted, as illustrated in Fig. 4, and the power is applied and the machine is started in the proper direction. It will sometimes happen, when only half of the endless-chain belt is a sprocket-chain and the balance a light cable, rope, or small chain, that the sprocket-chain will have one end, on which the pulling has taken place, drawn so near to the guide-pulleys that there is not length enough left to draw another stump on that side, because the light half of the endless-chain belt will not fit the sprocket-wheel. In that case it will be necessary to reverse the motion of the machine by turning the horse around the end of the sweep and starting him in the opposite direction, and to hitch to the other side of the sprocket-chain, letting the hitch-chain lie over or under the light part of the chain. This will only occur when the stumps are very numerous in about the same line on one side. As a rule, when all the hitches and pulls convenient to make on one side have been accomplished by the use of the sprocket-chain, then the direction of the horse is reversed and the hitches and pulls are made on the other side. After all the stumps near each side of the line of the sprocket-chain have been extracted, the pulley-block anchor is unfastened, and the block and main chain are swung to one side or the other, and a new anchorage is secured for the block, and another area is cleared of stumps, and so on over a great part of a circle.

I sometimes place a roller having, it may be, a tongue like an ordinary hand-roller, for convenience in moving it, under the hitch-chains near the stumps, as shown in Fig. 16, for securing a lifting pull; but as preferable I have provided a roller-frame composed of a straddling-base, P, and roller or grooved-pulley standards p p, to give a support for the roller or pulley in front of and on each side of the stump. For easy transfer of this roller and its frame from place to place, it may be turned over and the roller serve to roll it about, the frame serving as a handle. I may pivot my roller or pulley in any known way, so that it will turn, like a caster, a little to one side or the other, to accommodate the changing directions of the draft and chain pressure.

In some instances I employ a hitch-chain secured to a pulley-block, and a separate guy, which I secure at one end to the sprocket-chain and pass around the pulley to obtain increased power, and then anchor at the other end, as shown in Fig. 4. Where stumps are too low or too much decayed at the top for hitching by ordinary means, I employ a strong iron hook on the end of the hitch-chain to catch partly under them, operating somewhat like a cant-hook.

Instead of having my sprocket-wheel revolve horizontally, I may have it revolve vertically on a horizontal shaft, as shown in the modification, Figs. 7 and 8, in which I provide bevel-gears S and T to communicate motion. In this instance I use four guide-pulleys in front of the sprocket-wheel instead of three, and in connection with the upper pair I may use a pivoted swinging chain-supporting pulley, U, or equivalent support, such as a bar or shelf or trough. I may use other guide-pulleys of the kind mentioned in connection with the horizontal sprocket, substantially as shown in dotted lines, Figs. 7 and 8.

Instead of guide-pulleys in front of the sprocket-wheel of my machine, I sometimes employ a guide block or casting with a circular aperture, or preferably with an aperture in whole or in part of the outline of the sprocket-chain. Such apertures may be provided with one or more friction-rollers. This may be cast in one piece or in two pieces, and contain two apertures to receive the two sections of the sprocket-chain, or two separate blocks may be provided. The apertures may be flared or beveled front and back, as shown in Figs. 19 and 20, to prevent the links catching. This block may be secured rigidly to the main frame, or may be secured so as to swing from side to side within certain limits to accommodate the change in the line of draft. It may also be made so that it will partially encircle the sprocket-wheel, the apertures or channels through it being of sufficient length to conduct the sprocket-chain immediately to or around the sprocket-wheel in passing into the machine, and in passing out of it the aperture or channel on the other side of the sprocket-wheel will aid in discharging the sprocket-chain if a single sprocket-chain is used without the pulley-block G, or where there is not much tension in the endless sprocket chain or belt.

Guide-pulleys may also be effectually used in front of the guide-block when friction-rollers are not placed in the apertures of the block.

I do not claim in this application the combination of the main frame, driving-gears, sprocket-wheel, endless chain, pulley-block, and anchor-chains, or the combination of the main frame, sweep, driving-gears, sprocket-wheel, guide-pulleys, endless chain, separate pulley-block, anchor-chains, and hitching-chains, because I have made those combinations the subject of another application for patent; but What I here claim as my invention is—

1. In a stump-extractor, the combination, with a main frame and its anchor-chain and driving-gears, of a sprocket-wheel, an endless chain, a separate pulley-block, and its anchor-chain provided with a spring, substantially as described.

2. In a stump-extractor, the combination, with a main frame and its anchor-chain and driving-gears, of a sprocket-wheel, an endless chain composed one part of a sprocket-chain and the other of a rope, cable, or light chain, with or without one or more interposed springs, and with or without one or more swivels in the light part, and a separate pulley-block provided with a spring in its anchor-chain, substantially as described.

3. In a stump-extractor, the combination of a main frame and its anchor-chain and driving-gears, a sprocket-wheel, an endless chain, a separate pulley-block and its anchor-chain, a side-hitch chain, and a lifting-roller under it, substantially as described.

4. In a stump-extractor, the combination of a main frame with its anchor-chain and gears, the sprocket-wheel, the endless chain, and the separate pulley-block, with its anchor-chain in two parts, and the windlass, roller, or capstan for taking up slack, substantially as described.

5. In a stump-extractor, the combination, with a main frame, of the main chain and vertically-rotating sprocket-wheel, the guide-pulleys, and the chain-supporting pulleys, or equivalent, substantially as set forth.

6. In a stump-extractor, the combination, with the main frame provided with a sweep, anchor-chain, and driving-gears, of a sprocket-wheel and guide-pulleys, an endless chain, a separate pulley-block and anchor-chain, a separate anchor or guy-chain, and a hitching-chain provided with a pulley and hook, substantially as described.

7. In a stump-extractor, the combination, with the main frame and its anchor-chain and sprocket-wheel, of a sprocket-chain, with or without its side-hitch chain or chains, and a sprocket-chain guide block or blocks, substantially as described.

8. An endless-chain belt for a stump-extractor, composed one part of a strong sprocket-chain and the other of a cable, rope, or light chain, with or without one or more swivels in the light part, substantially as described.

9. An endless-chain belt for a stump-extractor, composed one part of a strong sprocket-chain and the other part of a cable, rope, or light chain, with or without one or more swivels in the light part, and with one or more interposed springs, substantially as described.

10. In a stump-extractor, the combination, with the main frame, of a pull-chain and a hollow shield pivoted by means of a rigid bar to the frame, so that the shield may move in all directions laterally with the chain, substantially as described.

11. The portable lifting-roller, supported on standards, and stump-straddling base, substantially as described.

In testimony whereof I have hereunto subscribed my name.

JOHN C. SHARP.

Witnesses:
D. C. GRISWOLD,
JAMES V. W. SOUN.